(12) United States Patent
Marino et al.

(10) Patent No.: US 9,726,913 B2
(45) Date of Patent: Aug. 8, 2017

(54) SEMICONDUCTOR INTERFEROMETRIC DEVICE

(71) Applicants: Fabio Alessio Marino, Mesa, AZ (US); Paolo Menegoli, San Jose, CA (US)

(72) Inventors: Fabio Alessio Marino, Mesa, AZ (US); Paolo Menegoli, San Jose, CA (US)

(73) Assignee: Awenyx Inc., San Jose, CA (US)

( * ) Notice: Subject to any disclaimer, the term of this patent is extended or adjusted under 35 U.S.C. 154(b) by 285 days.

(21) Appl. No.: 14/169,053

(22) Filed: Jan. 30, 2014

(65) Prior Publication Data

US 2015/0212385 A1    Jul. 30, 2015

(51) Int. Cl.
  *G02B 27/00*    (2006.01)
  *G02F 1/07*    (2006.01)
  *G02F 1/015*   (2006.01)

(52) U.S. Cl.
  CPC ...... *G02F 1/015* (2013.01); *G02F 2001/0152* (2013.01); *G02F 2203/02* (2013.01)

(58) Field of Classification Search
  CPC ...... G02F 1/015; G02F 1/133553; G02F 1/00; G02F 1/0018; G02F 1/0102; G02F 2001/0152; G02F 2001/212; G02F 2001/213; G02F 2203/02; G02F 3/00; H01L 51/5218; H01L 51/5234; H01L 51/5271; H01L 29/41733; H01L 31/105; H01L 33/0012; G02B 26/001; G02B 2006/12142
  USPC ....... 359/237, 238, 240, 245, 250, 263, 315, 359/337.22, 577–579, 585–588; 385/1, 2, 385/8, 14, 122; 438/31, 69
  See application file for complete search history.

(56) References Cited

U.S. PATENT DOCUMENTS

| | | | | |
|---|---|---|---|---|
| 4,790,635 A | * | 12/1988 | Apsley | .................... G02F 1/218 359/260 |
| 5,027,178 A | * | 6/1991 | Svilans | ................. B82Y 20/00 257/14 |
| 5,072,272 A | * | 12/1991 | Omura | .................... B82Y 20/00 257/14 |
| 5,144,397 A | * | 9/1992 | Tokuda | .................. B82Y 20/00 257/14 |
| 5,276,748 A | * | 1/1994 | Magel | .................... G02F 1/011 385/37 |
| 5,799,231 A | * | 8/1998 | Gates | .................. G02F 1/13473 399/115 |
| 5,802,222 A | * | 9/1998 | Rasch | ................ G02B 6/12007 348/E9.026 |

(Continued)

*Primary Examiner* — Bumsuk Won
*Assistant Examiner* — Collin X Beatty

(57) ABSTRACT

The present invention describes a semiconductor interferometric reflecting device capable of modulating the reflected light by modulating the carrier concentration inside a semiconductor device. The variation of the carrier concentration within the device causes the variation of the physical optical properties inside the semiconductor material leading to a shift of the reflected and absorbed light spectrums. The modulating layer is fabricated on an optically smooth substrate, i.e., sufficiently smooth to allow for the occurrence of interference effects. Furthermore, if desired, the same device can be designed to emit or reflect the desired light. The present invention may be utilized for a reflective flat panel display comprising an array of semiconductor interferometric reflecting devices.

18 Claims, 9 Drawing Sheets

(56) References Cited

U.S. PATENT DOCUMENTS

| | | | | |
|---|---|---|---|---|
| 5,832,155 A * | 11/1998 | Rasch | ............... | G02B 6/12004 |
| | | | | 385/14 |
| 5,978,141 A * | 11/1999 | Karwacki | .............. | B82Y 20/00 |
| | | | | 359/584 |
| 6,269,199 B1 * | 7/2001 | Maloney | ................ | G02F 1/015 |
| | | | | 359/245 |
| 7,142,761 B2 * | 11/2006 | Liu | ......................... | G02F 1/025 |
| | | | | 385/131 |
| 7,280,712 B2 * | 10/2007 | Liu | ......................... | G02F 1/025 |
| | | | | 385/1 |
| 8,861,072 B2 * | 10/2014 | Arsenault | ................ | G02F 1/15 |
| | | | | 359/321 |
| 2003/0035972 A1 * | 2/2003 | Hanson | .................... | B32B 7/02 |
| | | | | 428/480 |
| 2006/0045522 A1 * | 3/2006 | Gill | ......................... | G02F 1/025 |
| | | | | 398/50 |
| 2006/0077154 A1 * | 4/2006 | Gally | ................... | G02B 26/001 |
| | | | | 345/85 |
| 2007/0195416 A1 * | 8/2007 | Lazarev | ................ | G02B 5/287 |
| | | | | 359/578 |
| 2007/0229936 A1 * | 10/2007 | Miles | ..................... | B82Y 20/00 |
| | | | | 359/291 |
| 2009/0279173 A1 * | 11/2009 | Chui | ..................... | G02B 5/201 |
| | | | | 359/577 |
| 2010/0182671 A1 * | 7/2010 | Park | ..................... | G02F 1/0311 |
| | | | | 359/245 |
| 2011/0261088 A1 * | 10/2011 | Seo | ..................... | G09G 3/3466 |
| | | | | 345/690 |
| 2013/0077965 A1 * | 3/2013 | Nikolic | .................. | G02F 1/015 |
| | | | | 398/38 |
| 2015/0070320 A1 * | 3/2015 | Hong | ..................... | G06F 3/042 |
| | | | | 345/175 |

* cited by examiner

SEMICONDUCTOR INTERFEROMETRIC DEVICE

BACKGROUND OF THE INVENTION

1. Field of the Invention

The present invention relates to electromagnetic radiation in the visible spectrum (including ultra-violet and infrared) modulator arrays. The present invention is further in the field of semiconductor structures. The present invention further relates to the field of integrated devices and circuits. The present invention further relates to the field of electronic displays. The present application describes semiconductor structures whose optical characteristics can be actively modified so that they can modulate light. The implementation is not limited to a specific technology, and applies to either the invention as an individual component or to inclusion of the present invention within larger systems.

2. Brief Description of Related Art

In nature colors are not emitted by active elements, like it occurs for electronic displays, but they are the result of reflection of incident light. Some animals, such as butterflies, achieve a broad range of color, brightness and contrast by processing interferometrically incident light. In an interferometric structure incident light is reflected in a way that specific wavelengths interfere with each other. If two waves of same frequency have the same phase the interference is constructive and the result is a very vivid color. Constructive interference of light can be obtained by determining selectively the optical paths of the optical waves.

Interferometric devices that reflect incident light to produce electronic displays that use only ambient light already exist. They are based on MEMS (Micro Electro Mechanical Systems) technologies that change the length of the optical paths by applying an electrostatic voltage to the MEMS structure. However MEMS have moving elements, therefore are subject to poor reliability because the elements degrade with time and eventually fail. Moreover MEMS are certainly faster than LCD (liquid Crystal Displays) but are still slow for very fast applications. Furthermore MEMS are typically by-stable and assume only two states, therefore are more prone to digital control.

It is desirable to have reflective displays that utilizes the interferometric concept of incident light with structures that are faster, more reliable, and more cost effective than the MEMS technologies and possibly that can be controlled in analog fashion.

SUMMARY OF THE INVENTION

The present invention describes a semiconductor Interferometric reflecting device (IRD), which is able to modulate light by varying the depletion region and the electric field inside a semiconductor layer. The variation of the depletion region (and electric field) inside the device causes the variation of the refractive index (and/or the absorption coefficient) inside the depleted material leading to a shift of the reflected and absorbed light spectrums. The modulating layer is fabricated on an optically smooth substrate, i.e., sufficiently smooth to allow the occurrence of interference effects. If desired, the same pn junction can be designed to behave at the same time as a light interferometric reflecting device and a light emitting diode depending on the bias applied to the pn junction. The invention may be utilized for a direct view reflective flat panel display comprising an array of semiconductor interferometric reflecting devices.

In order to better understand the main concept of the present invention, one may consider a multi-layer stacked structure as the one depicted in FIG. 1. When a light ray 2 coming from the medium 1 of refractive index $n_1$ strikes against the interface with the second medium 6 of refractive index $n_2$ with a small incident angle, the reflected ray 3 has a difference in phase with respect to the ray 4 reflecting on the bottom of the second medium, equal to:

$$\delta = \frac{2\pi}{\lambda_n}2d = \frac{4\pi n_2 d}{\lambda n_1} - \pi$$

where d is the thickness of the medium of refractive index $n_2$, $\lambda_n$ is the wave length of the light in this medium, $\lambda$ is the wave length of the light in the vacuum, and we assumed $n_2 > n_1$.

The interference between the two emerging rays is therefore constructive if:

$$\delta = 2m\pi \Rightarrow n_2 = \frac{\lambda n_1 (2m+1)}{4d}, \text{ with } m = 0, \pm 1, \pm 2, \pm 3 \ldots$$

or destructive, if:

$$\delta = (2m+1)\pi \Rightarrow n_2 = \frac{\lambda n_2 m}{2d}, \text{ with } m = 0, \pm 1, \pm 2, \pm 3 \ldots$$

By varying the refractive index of the modulating layer 6 it is therefore possible to modulate the intensity of the reflected light resulting by the interference of the two reflected rays in the medium with refractive index $n_1$ and $n_2$. It is important to notice that similar results can be obtained by using a modulation layer formed with a piezoelectric material and by modulating the electric field across it in order to change its thickness.

Let us consider now the device illustrated in FIG. 2, where the medium with the refractive index $n_2$ of the previous figure has been replaced with a n-doped semiconductor layer 12 in contact with a p-doped region 11 in order to form a p-n junction.

In this case, assuming for simplicity to use air (refractive index ~1) as incident medium 7, the constructive relation becomes:

$$\delta = 2m\pi \Rightarrow n_2 = \frac{\lambda(2m+1)}{4d}, \text{ with } m = 0, \pm 1, \pm 2, \pm 3 \ldots$$

where $n_s$ is the semiconductor layer refractive index in case of not depleted material.

We can now define the thickness d of the semiconductor layer in order to reflect only some wave length and not others.

When a large enough reverse voltage is applied between the p-doped and the n-doped regions, the n-region 12 (having a lower doped level with respect the p-doped one) completely depletes, changing its refractive index. When this phenomenon occurs the spectrum of the reflected wave lengths changes causing a modulation of the reflected light color (and/or intensity).

It is important to notice that the described principle can be utilized also by exploiting the change in the absorption coefficient of the semiconductor as a function of the carrier concentration and/or electric field: depleting the semiconductor, its absorption coefficient changes causing an increase or a decrease of the reflected light.

Proper selection of materials allows for the fabrication of displays with individual pixels that can switch from reflecting any color (or combination of colors) to absorbing (e.g. change from blue to black), or from reflecting any color combination to reflecting only one particular color (e.g. change from white to red).

Another structure exploiting the same principle is depicted in FIG. 3, where a multilayer configuration has been used to determine the color (i.e. the wave length) of the reflected light based on the value of the reverse voltage applied to two pn junctions. Each layer contributes to the thickness of the final modulation layer. If desired, the insulating layer 20 can be also replaced with a high band-gap (Eg2) semiconductor material or it can be omitted (if desired) when the band-gaps of the two layers 16 and 21 are different. In general, the band-gaps of the two layers 16 and 21 can be optimized to improve the device performance. For example, layer 16 can be formed with a first band-gap Eg1 in order to be transparent to the radiation that must be reflected from layer 21 which can have a different band-gap Eg3. It is important to notice that the concept of FIG. 3 can be extended to three or more staked pn junctions in order to modulate different light colors with the same device.

Another embodiment, where the pn junction is vertical instead of horizontal is reported in FIG. 4. This configuration allows for a more uniform depletion of the modulating layers 25, 27, and 28. These layers can be formed with the same material, or their band-gaps can be engineered in order to improve the device performance. For example, the band-gap of the central layer 27 can be lower than the one of the other two layers 25 and 28 so as to form a quantum well inside the device.

FIG. 5 shows another implementation of the present invention where the p-doped layer has been replaced with a reflective metal layer 33 forming a Schottky junction with the modulating layer 34. In this case a transparent metallic layer 32 (e.g. made of Indium Tin Oxide—ITO) is used to contact the n-doped layer 34 above the structure in order to allow the light to reach layer 34. If desired, the reflective metal and the modulating layer material can be chosen so as to form a schottky contact between layers 32 and 34 and an ohmic one between layers 34 and 33.

More in general, any thin film, medium, or substrate (which can be considered a thick film) can be defined in terms of a characteristic optical admittance. By considering only the reflectance, the operation of a thin film can be studied by treating it as an admittance transformer. That is, a thin film or combination of thin films (the transformer) can alter the characteristic admittance of another thin film or substrate (the transformed film) upon which it is deposited. In this fashion a normally reflective film or substrate may have its characteristic admittance altered (i.e. transformed) in such a way that its reflectivity is enhanced and/or degraded by the deposition of, or contact with, a transformer. In general there is always reflection at the interface between any combination of films, mediums, or substrates. The closer the admittances of the two, the lower the reflectance at the interface, to the point where the reflectance is zero when the admittances are matched.

An interesting structure exploiting the principle described above is illustrated in FIG. 6. As it can be seen a multi-layer structure has been formed in order to obtain a Bragg reflector. Each layer boundary causes a partial reflection of an optical wave. For waves whose wavelength is close to four times the optical thickness of the layers, the many reflections combine with constructive interference, and the layers act as a high-quality reflector.

When no potential is applied between the n-doped layers 38 and the p+-doped layer 37, the device behaves as a Bragg reflector allowing for the reflection of a determinate wave length, based on the thickness chosen for the different layers.

Whereas, when the n-doped layers 38 are depleted, the light passes through the entire structure without exhibiting reflection at the interfaces and is absorbed completely at the bottom layer 37 of the device. Indeed, in depletion conditions the n-doped layers 38 are optically matched with the intrinsic ones 36, significantly reducing the intensity of the reflected light. The optional layer 35 is used to contact the n-doped layers. As shown in figure, the lower n-doped layers can be replaced with p-doped ones.

In FIG. 7 has been reported the spectrum of the reflected light resulting by the simulation of the embodiment of FIG. 6 for no voltage applied (black line 39) and after the n-layers have been completely depleted (gray line 40), assuming a 0.5% change in the refractive index between neutral and depleted conditions.

Another interesting implementation of the present invention is illustrated in FIG. 8, where also the band-gaps of the different layers have been engineered in order to improve the device performance. In this case, the band-gap of the layers 41 (i.e. Eg2) can be chosen to be lower than the band-gap of layers 43 (i.e. Eg1) so as to form a series of quantum wells. This configuration allows the exploitation of the quantum-confined Stark effect to increase the refractive index variation as a function of the applied voltage.

In absence of an external electric field, electrons and holes, within the quantum well, may only occupy states within a discrete set of energy sub-bands. Consequently, only a discrete set of frequencies of light may be absorbed or emitted by the system. When an external electric field is applied, the electron states shift to lower energies, while the hole states shift to higher energies. This reduces the permitted light absorption or emission frequencies. Additionally, the external electric field shifts electrons and holes to opposite sides of the well, decreasing the overlap integral, which in turn reduces the recombination efficiency (i.e. fluorescence quantum yield) of the system. The spatial separation between the electrons and holes is limited by the presence of the potential barriers around the quantum well, meaning that excitons are able to exist in the system even under the influence of an electric field.

The implementation of the embodiment of FIG. 8 with lateral contacts is shown in FIG. 9, where the contacts have been formed laterally instead of above or below the structure. Also hybrid versions are possible, where one contact is formed above or below the structure and the other one is lateral. Furthermore, also grid shaped contacts (e.g. as the ones used in solar-cells) are possible.

The above concept to modulate the carrier concentration and electric field inside at least a portion of a semiconductor layer in order to control the interference of a reflected light, can be achieved also by using a Metal/dielectric/semiconductor structure (or a semiconductor/insulator/semiconductor structure) instead of a rectifying junction. Also in this case, indeed, the variation of the electrical parameters leads to a variation of the optical properties of the semiconductor layer in contact with the dielectric (especially at the interface, where also inversion of the semiconductor can take place), which allows for the control of the interference of the reflected light.

An example of implementation of the present invention by using a Metal/dielectric/semiconductor structure (or a semiconductor/insulator/semiconductor structure) is shown in FIG. 10. As it can be seen this structure is very similar to the one of a MOSFET, with the difference that in this case the thickness of the conductive layer 50, the dielectric layer 56 and, if desired, also the layers 54 and 53 (if present) are carefully chosen in order to obtain interference of the light rays reflected at the device interfaces.

The conductive layer 50 can be made both in transparent metallic materials (such as Indium Tin Oxide—ITO) or doped semiconductors (lowly or highly doped). The two n+ regions 51 and 55 are optional. However it is preferred to have at least one of them in order to supply carriers to the inversion layer that forms at the semiconductor/dielectric interface when the structure is opportunely biased. Region 52 contacting the modulation layer 54 can be also formed in the dimension perpendicular to the shown cross-section. Under layer 54 one or more optional layers can be formed in order to optimize the optical properties of the device. Furthermore, the dielectric layer 56 can be replaced with a high-band gap material so as to obtain a HFET like structure (in this case, if desired, the two regions 51 and 55 can be formed on top of layer 56).

Given the presence of multiple contacts, this structure can be controlled in different ways in order to optimize the device performance (for example a first bias can be applied across the pn junctions and a second one can be applied across the MOS system). The most simple control configuration is obtained by shortening the A1, A2 and A3 terminals to a common Anode (A) terminal (but also other configurations are possible). In this case, when a positive voltage is applied between the C and the A terminals, electrons starts to collect (by inversion or accumulation) underneath the dielectric layer 56 changing the interface optical properties.

Similar result is obtained by applying a negative voltage between the C and the A terminals, with the difference that in this case the carriers collected underneath the dielectric layer 56 are holes. The modulation of the interface optical parameters can be therefore obtained by varying the bias voltage both in the positive and negative range, or only in one of the two ranges.

The use of a MOS (or a Hetero-structure) based structure increases the carrier concentration variation with respect to a rectifying junction. Furthermore, it is possible to work in accumulation, depletion and inversion regime significantly improving the modulation capabilities of the device.

Another embodiment of the present invention employing a MOS (or a Hetero-structure) based structure is illustrated in FIG. 11. In this case, the modulation layer 61 has been contacted on the bottom side by a reflective metal layer.

Another interesting implementation of the present invention is reported in FIG. 12, where a rectifying junction has been formed under the modulation layer 69 in order to improve the modulation capabilities of the device. In this case region 70 is used to contact the modulation layer 69 and region 67 is used to bias the buried region 68. Region 66 is optional and it can be doped with p-type impurities in order to improve the control on the bias of the modulation layer 69 or it can be n-doped in order to supply electrons at the semiconductor/dielectric interface (when needed). Furthermore, region 67 can be formed in the dimension perpendicular to the shown cross section or it can be auto-aligned with layer 65 when region 66 is omitted. Region 68 can be also made in metallic materials if desired (in this case the contacting region 67 can be formed in a many ways).

The embodiments discussed above can be also used upside down as shown in FIGS. 13 and 14. In these two cases the incident light hits first the semiconductor modulation layer. These two configurations are of particular interest when realized with organic semiconductor materials. In FIG. 13, regions 75 and 78 are optional and they can be or not auto-aligned with region 77 and 76. Regions 75 and 78 can also be created not in contact with the semiconductor/dielectric interface. Furthermore, they can be also realized on the upper portion or on top of the modulation layer 74 (configuration particularly practical in the case where organic semiconductors are used) or in the dimension perpendicular to the shown cross section. Similar considerations holds true for region 79 which is used to contact the modulation layer 74. Layers 73 are optional and can include (or be replaced) by a passivation layer.

FIG. 14 shows a cross section view of a semiconductor interferometric reflecting device according to a further embodiment of the present invention. This structure is similar to the ones of FIGS. 11 and 12, with the difference that in this case the incident light hits the MOS system through the semiconductor modulation layer as in FIG. 13. Also in this structure, if the optional layer 81 is omitted or is mash shaped, regions 82 and/or 85 can be realized (if desired) on the upper portion or on top of the modulation layer 86.

Multiple modulation system as the ones discussed above can be stacked one on top of the other in order to improve the device performance. An example of embodiment where two MOS systems 95 and 96 have been stacked one on top of the other is reported in FIG. 15. In this case one of the two MOS system has been formed upside-down with respect to the other one in order to share the modulation layer 88 between the two. Similar combinations can be obtained by combining two or more other structures reflecting another embodiment (or different ones) of the present invention.

Multiple modulation systems can be also combined as shown in FIG. 16. Also in this case, similar combinations can be obtained by combining two or more other structures reflecting another embodiment (or different ones) of the present invention.

As well-known to anyone skilled in the art, the basic idea of the proposed invention can be improved utilizing optically matching layers. Referring to FIG. 17, reflector 113 (the transformed film) is separated from induced absorber 114 (the transformer), comprising films 109, 110, and 111, by a variable refractive index spacer 112 (the modulating layer). Incident medium 108 bounds the other side of induced absorber 114. The first layer 109 is to match the admittances of reflector 113 and incident medium 108. This is accomplished via matching layer 111, which is used to transform the admittance of absorber 110 to match that one of the incident medium 108, and via matching layer 109, which is used to transform the admittance of reflector 113 to match that one of absorber 110. The second function is the absorption of light. This is accomplished using absorber 110, which performs the function of attenuating light which is incident upon it through the medium, as well as light that is incident upon it from the reflector. The ability to alter the refractive index of spacer 112 (or of the layers forming the induced absorber) allows the alteration of the optical characteristics of the entire structure.

In many of the described embodiments, the p+ region can be replaced by a Schottky contact and/or the n+ region can be replaced with a metal ohmic contact (or vice-versa). When a Schottky contact is used in combination with a III-V process technology, an optional extra wide energy-gap layer can be interposed between the metal and the n-doped semiconductor in order to reduce the current leakage associated with the Schottky contact. Furthermore, if desired, also a Metal/dielectric/semiconductor structure (or a semiconductor/insulator/semiconductor structure) can be used instead of a rectifying junction in order to modulate the refractive index and/or the absorption coefficient of at least a portion of a semiconductor layer according to the present invention.

All the described embodiments can be built in many different technologies, comprising: Bulk, Semiconductor On Insulator, Semiconductor On Sapphire, Thin-film-transistor technology, III-V technology with or without hetero-junctions or organic semiconductor technology. Furthermore the concept of the present invention can be realized also with organic semiconductor materials in order to obtain low cost reflective devices.

All the embodiments illustrated above can be realized as both discrete and integrated components with minimal changes. For each one of them, the dual version can be obtained by simply substituting the n-doped regions with p-type ones and vice-versa. Many other configurations can be obtained by combining the different embodiments described above and their variants. In general, supplemental contacts can be added in the third dimension (perpendicular to the ones shown) in order to improve the device performance.

As anticipated above, a direct view reflective flat panel display can be obtained employing the present invention, by utilizing an array of semiconductor interferometric reflecting devices as described in the present invention. An optical compensation layer can be added to the top of the proposed structures to serve two functions in the display application. The first function is mitigating or eliminating the shift in reflected color with respect to the angle of incidence. This is a characteristic of all interference films and can be compensated for by using films with specifically tailored refractive indices or holographic properties, as well as films containing micro-optics; furthermore other means may also be possible. The second function is to supply a supplemental front-lighting source. In this way, additional light can be added to the front of the display when ambient lighting conditions are significantly diminished by allowing the display to perform in conditions ranging from intense brightness to total darkness. Such a front-light could be fabricated using patterned organic emitters or edge lighting sources coupled to a micro-optic array within the optical compensation film; other ways may also be possible.

It is important to notice that, since the present invention describes a structure made of semiconductor materials, LED (Light Emitting Diodes) structures can be incorporated directly into the proposed invention in order to supply light to the screen when ambient lighting conditions are significantly reduced thus allowing the display to perform once again in conditions ranging from intense brightness to total darkness.

Furthermore, if desired, the same rectifying junction can be designed to behave at the same time as a light reflecting diode and a light emitting diode depending on the bias applied to the junction: when the junction is reversed bias the device behaves as a reflector, modulating the intensity of the reflected light, whereas when the rectifying junction is forward biased the electron-hole recombination that takes place inside the device leads the structure to behave like an LED. Furthermore, the MOS based structures can be designed to work at the same time as interferometric reflector and Light Emitting Transistor (LET).

The present invention offers also other advantages some of which are described here below. High quality full-color flat panel displays may be fabricated by using pixels based on these new semiconductor structures. By fabricating a pixel that switches between two colors (for example red and black) a flat-panel display may be implemented by combining three sets of such pixels designed to switch between red and black, green and black, and blue and black respectively. The inherent color precludes the need for color filter arrays which are typically required for color LCDs. Additionally, since the proposed structures can use greater than 90% of the incident light, they are excellent candidates for this application.

The same concept of modulating the light by varying the depletion layer can be utilized for image through displays, like glasses, where the undesired light is reflected back and the desired light at the desired length wave (color) is passed through the display As it is clear to those skilled in the art, the basic system of the present invention can be implemented in many specific ways, and the above descriptions are not meant to designate a specific implementation.

BRIEF DESCRIPTIONS OF THE DRAWINGS

The features, objects, and advantages of the present invention will become apparent upon consideration of the following detailed description of the invention when read in conjunction with the drawings in which.

DETAILED DESCRIPTION OF SPECIFIC EMBODIMENTS

A FIG. 1

Figure 1:
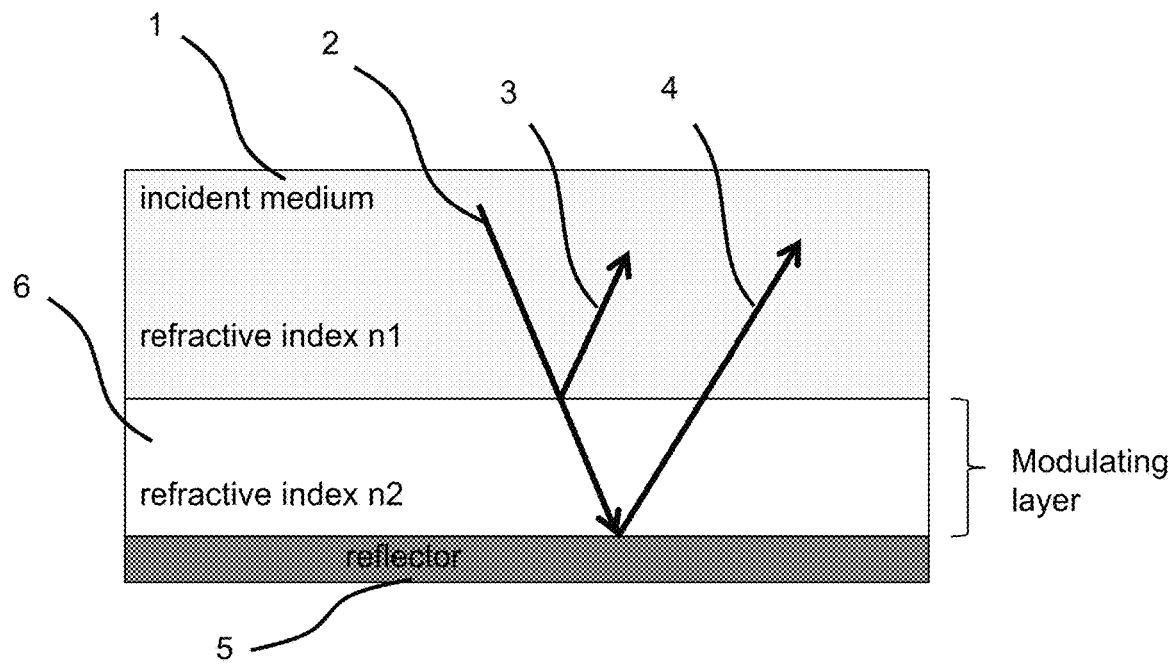
FIG. 1 shows a cross section view of a semiconductor interferometric reflecting device according to a first embodiment of the present invention.

FIG. 1 is showing a multi-layer stacked structure according to the basic concept of the proposed invention. When a light ray 2 coming from the medium 1 of refractive index $n_1$ strikes against the interface with the second medium 6 of refractive index $n_2$ with a small incident angle, the reflected ray 3 has a difference in phase with respect to the ray 4 reflecting at the bottom of the second medium, equal to:

$$\delta = \frac{2\pi}{\lambda_n} 2d = \frac{4\pi n_2 d}{\lambda n_1} - \pi$$

where d is the thickness of the medium of refractive index $n_2$, $\lambda_n$ is the wave length of the light in this medium, $\lambda$ is the wave length of the light in the vacuum, and we assumed $n_2 > n_1$.

The interference between the two emerging rays is therefore constructive if:

$$\delta = 2m\pi \Rightarrow n_2 = \frac{\lambda n_1(2m+1)}{4d}, \text{ with } m = 0, \pm 1, \pm 2, \pm 3 \ldots$$

or destructive, if:

$$\delta = (2m+1)\pi \Rightarrow n_2 = \frac{\lambda n_2 m}{2d}, \text{ with } m = 0, \pm 1, \pm 2, \pm 3 \ldots$$

By varying the refractive index of the modulating layer 6 it is therefore possible to modulate the intensity of the reflected light resulting by the interference of the two reflected rays in the medium with refractive index n1.

B FIG. 2

Figure 2:
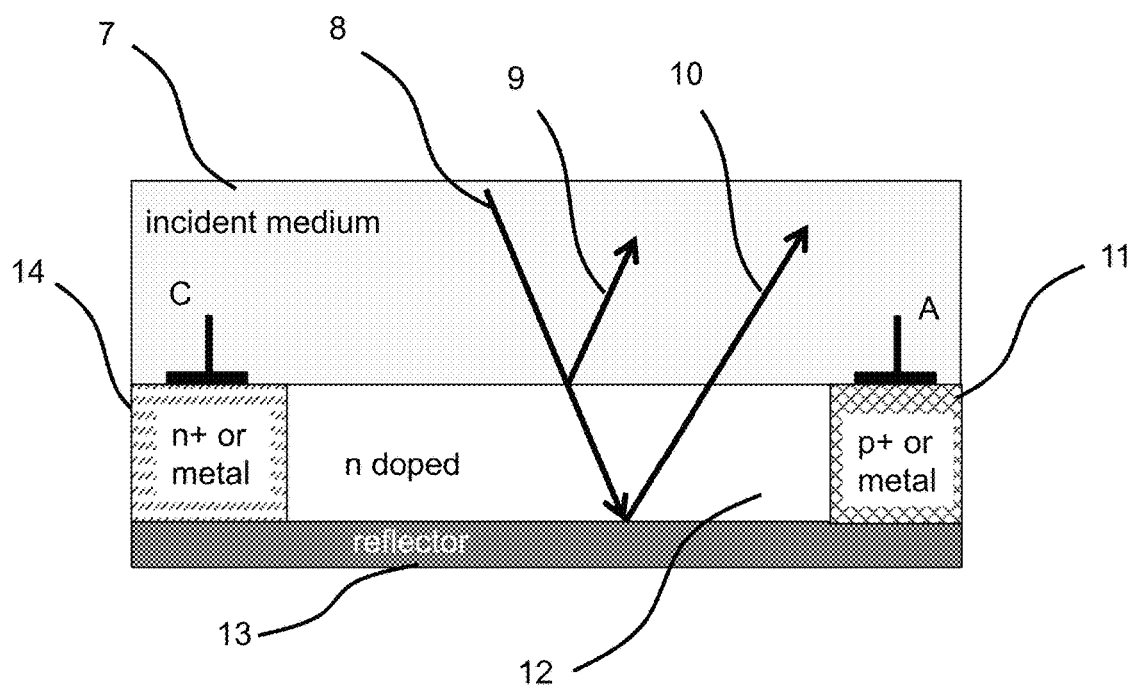
FIG. 2 shows a cross section view of a semiconductor interferometric reflecting device according to a further embodiment of the present invention, where a pn junction has been used to modulate the refractive index of the modulating layer.

FIG. 2 is depicting the cross-section view of a semiconductor interferometric reflecting device according to a further embodiment of the present invention, where a pn junction has been used to modulate the refractive index of the modulating layer.

In this case, assuming to use air (refractive index ~1) as incident medium 7, the constructive relation becomes:

$$\delta = 2m\pi \Rightarrow n_2 = \frac{\lambda(2m+1)}{4d}, \text{ with } m = 0, \pm 1, \pm 2, \pm 3 \ldots$$

where $n_s$ the semiconductor layer refractive index in case of not depleted material.

We can now define the thickness d of the semiconductor layer in order to reflect only some wavelength and not others.

When a large enough reverse voltage is applied between the p-doped and the n-doped regions, the n-region 12 (having a lower doped level with respect the p-doped one) completely depletes, changing its refractive index. When this phenomenon occurs the spectrum of the reflected wave lengths changes causing a modulation of the reflected light color (and/or intensity).

It is important to notice that the described principle can be utilized also by exploiting the change in the absorption coefficient of the semiconductor as a function of the carrier concentration and/or electric field: depleting the semiconductor, its absorption coefficient changes causing an increase or a decrease of the reflected light.

C FIG. 3

Figure 3:
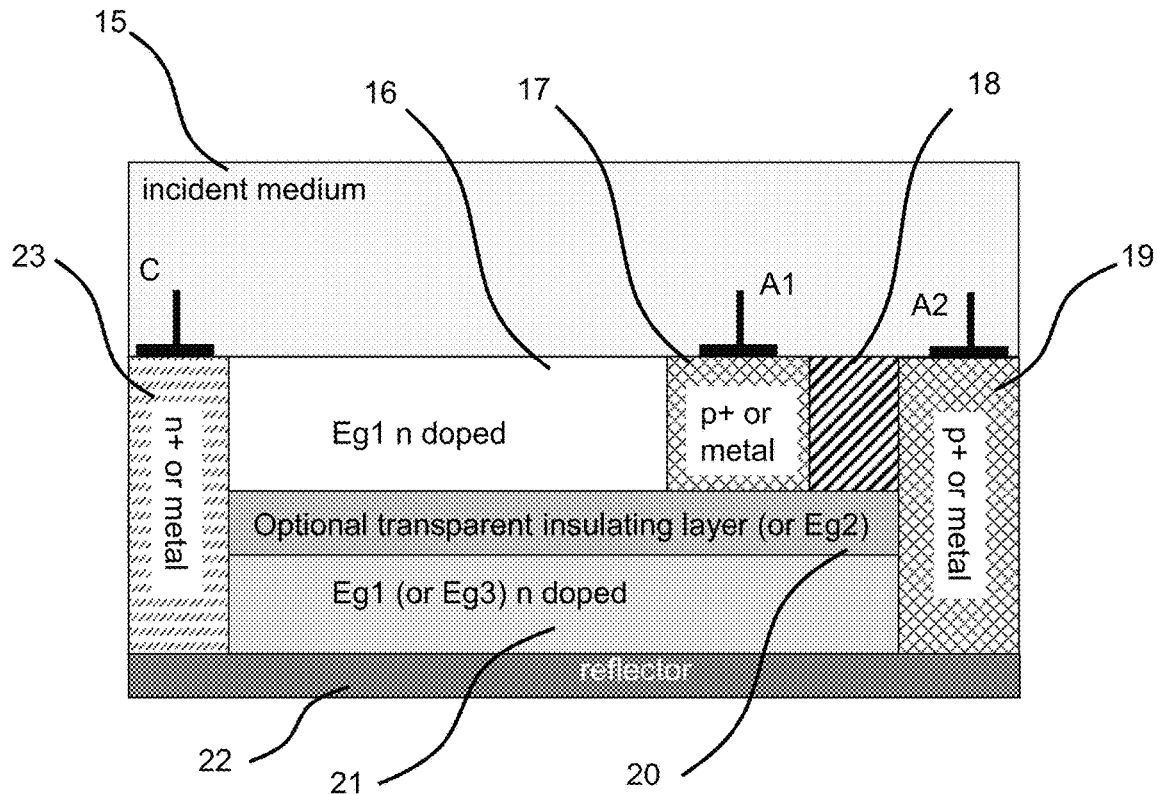
FIG. 3 shows a cross section view of a semiconductor interferometric reflecting device according to a further embodiment of the present invention, where a multilayer configuration has been used to determine the color (i.e. the wave length) of the reflected light based on the value of the reverse voltage applied to two pn junctions.

FIG. 3 shows a cross section view of a semiconductor interferometric reflecting device according to a further embodiment of the present invention, where a multi-layer configuration has been used to determine the color (i.e. the wavelength) of the reflected light based on the value of the reverse voltage applied to two pn junctions. Each layer contributes to the thickness of the final modulation layer. If desired, the insulating layer 20 can be also replaced with a high band-gap (Eg2) semiconductor material or it can be omitted (i.e. layer 20 is optional) when the band-gaps of the two layers 16 and 21 are different. In general, the band-gaps of the two layers 16 and 21 can be optimized to improve the device performance. For example, layer 16 can be formed with a first band-gap Eg1 in order to be transparent to the radiation that must be reflected from layer 21 which can have a different band-gap Eg3. It is important to notice that the concept of FIG. 3 can be extended to 3 or more staked pn junctions in order to modulate different light colors with the same device.

FIG. 4

Figure 4:
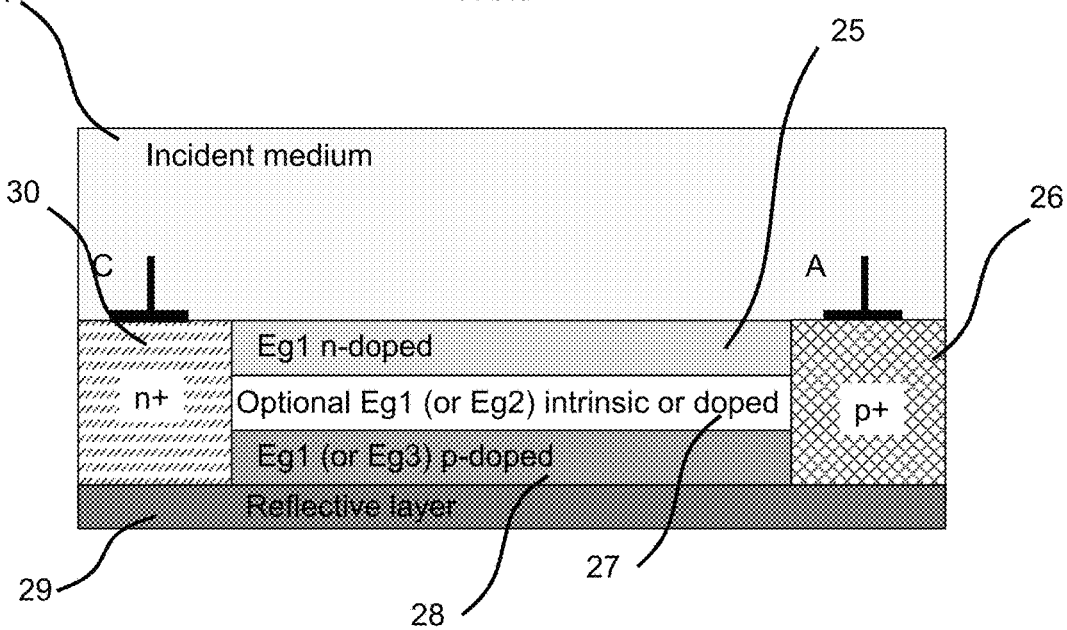
FIG. 4 shows a cross section view of a semiconductor interferometric reflecting device according to a further embodiment of the present invention, where the pn junction is placed vertically instead of horizontally.

FIG. 4 is depicting a cross section view of a semiconductor interferometric reflecting device according to a further embodiment of the present invention, where the pn junction is vertical instead of horizontal. This configuration allows for a more uniform depletion of the modulating layers 25, 27, and 28. These layers can be formed with the same material or their band-gaps can be engineered in order to improve the device performance. For example, the band-gap of the central layer 27 can be lower than the one of the other two layers 25 and 28 so as to form a quantum well inside the device.

FIG. 5

Figure 5:
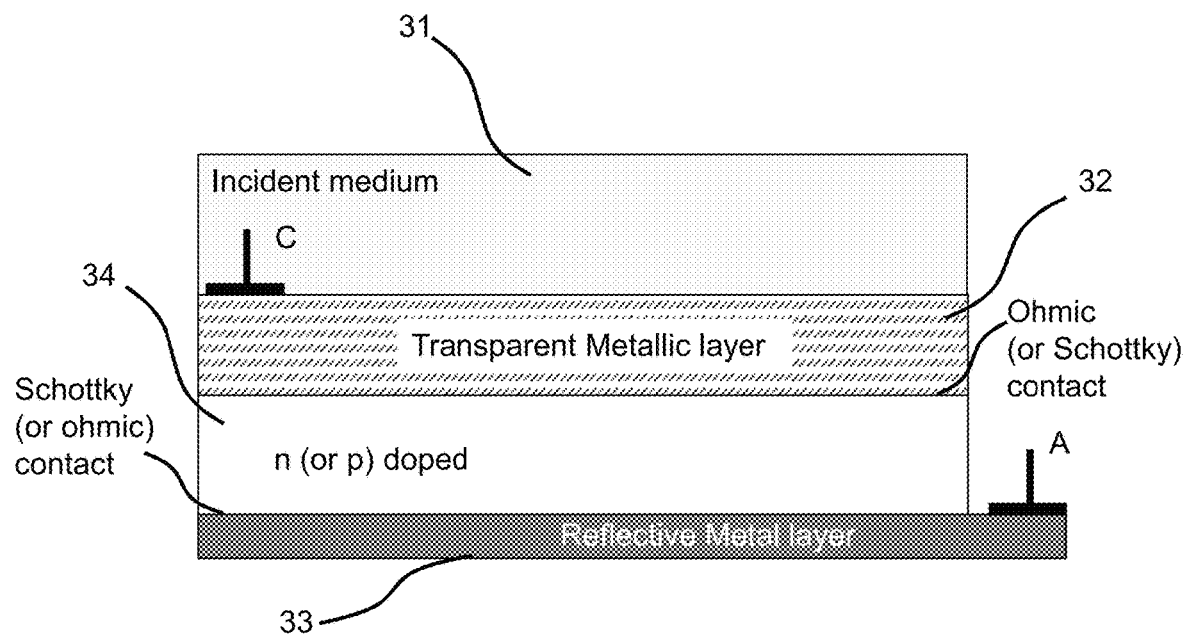
FIG. 5 shows a cross section view of a semiconductor interferometric reflecting device according to a further embodiment of the present invention, where a horizontal Schottky junction has been used to modulate the depletion region inside the semiconductor device.

FIG. 5 shows another implementation of the present invention where the p-doped layer has been replaced with a reflective metal layer 33 forming a Schottky junction with the modulating layer 34. In this case a transparent metallic layer 32 (e.g. made of Indium Tin Oxide—ITO) is used to contact the n-doped layer 34 above the structure so as to allow the incident light to reach layer 34. If desired, the reflective metal and the modulating layer material can be chosen so as to form a schottky contact between layers 32 and 34 and an ohmic one between layers 34 and 33.

FIG. 6

Figure 6:
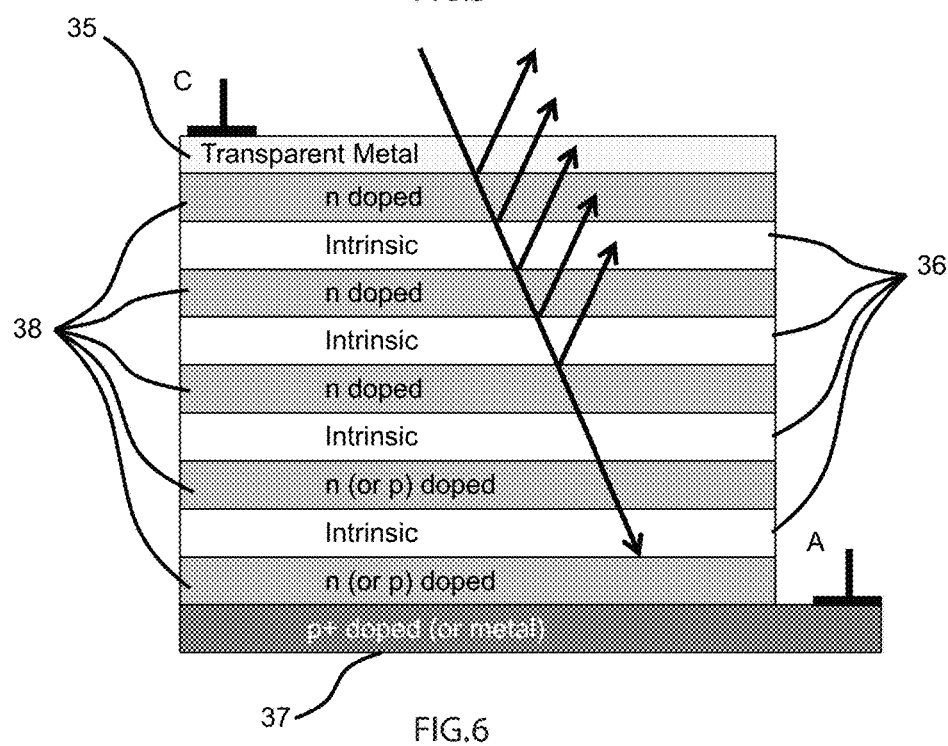
FIG. 6 shows a cross section view of a semiconductor interferometric reflecting device according to a further embodiment of the present invention, where a multi-layer structure has been formed in order to obtain a Bragg reflector.

FIG. 6 shows a cross section view of a semiconductor interferometric reflecting device according to a further embodiment of the present invention, where a multi-layer structure has been formed in order to obtain a Bragg reflector. Each layer boundary causes a partial reflection of an optical wave. For waves whose wavelength is close to four times the optical thickness of the layers, the many reflections combine with constructive interference, and the layers act as a high-quality reflector.

When no potential is applied between the n-doped layers 38 and the p+-doped layer 37, the device behaves as a Bragg reflector allowing for the reflection of a determinate wave length, based on the thickness chosen for the different layers.

Whereas, when the n-doped layers 38 are depleted, the light passes through the entire structure without exhibiting reflection at the interfaces and is absorbed completely at the bottom layer 37 of the device. Indeed, in depletion conditions the n-doped layers 38 are optically matched with the intrinsic ones 36, significantly reducing the intensity of the reflected light. The optional layer 35 is used to contact the n-doped layers. As shown in figure, the lower n-doped layers can be replaced with p-doped ones.

FIG. 7

Figure 7:
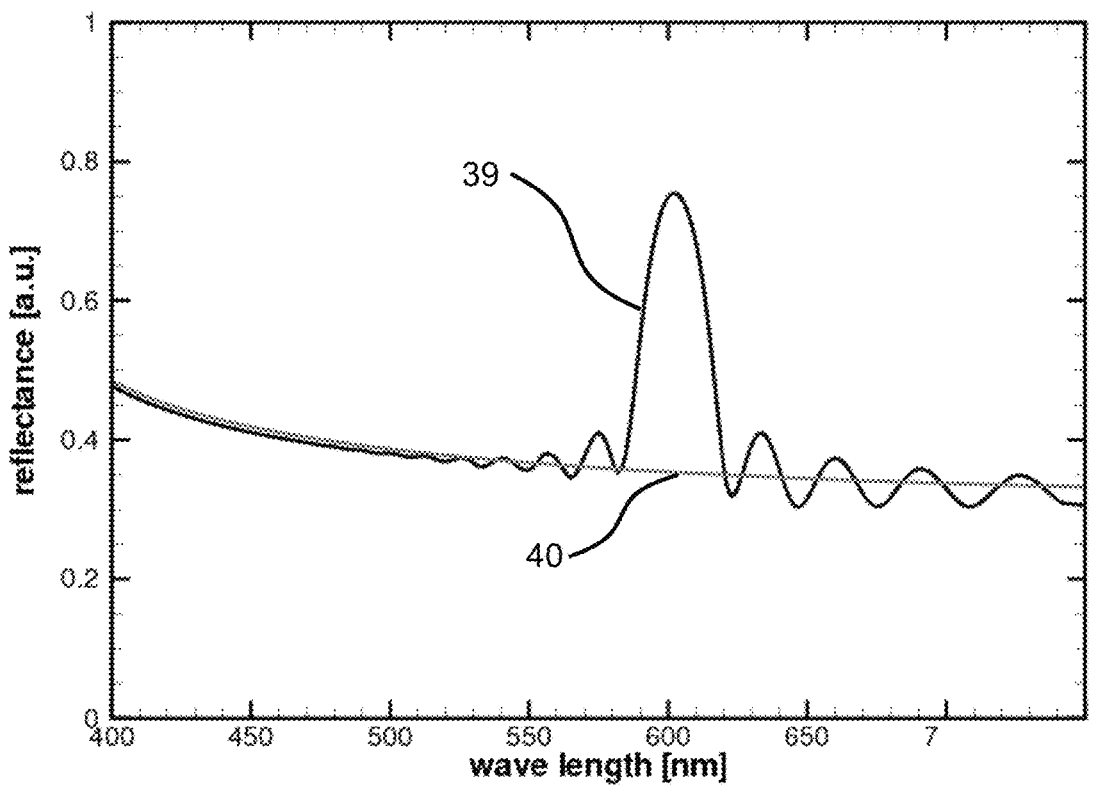
FIG. 7 shows the spectrum of the reflected light for the embodiment of FIG. 6 for no voltage applied (black line 39) and after the n-regions have been completely depleted (gray line 40), assuming for a 0.5% change in the refractive index between neutral and depleted conditions.

FIG. 7 shows the spectrum of the reflected light resulting by the simulation of the embodiment of FIG. 6 for no voltage applied (black line 39) and after the n-layers have been completely depleted (gray line 40), assuming for a 0.5% change in the refractive index between neutral and depleted conditions.

FIG. 8

Figure 8:
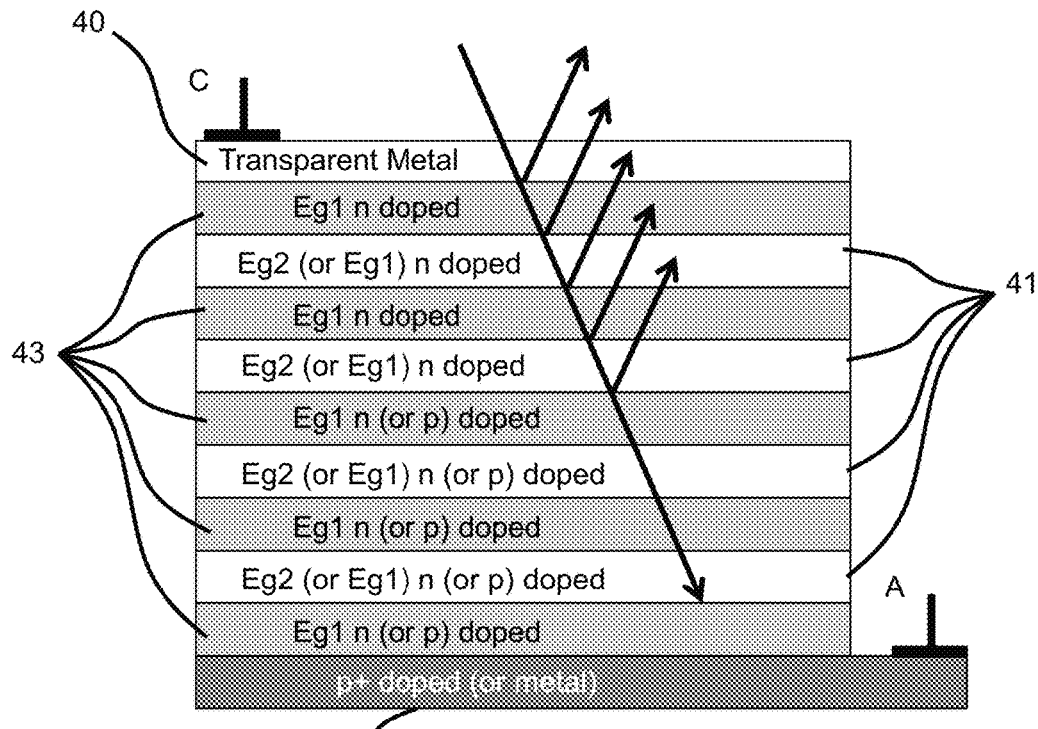
FIG. 8 shows a cross section view of a semiconductor interferometric reflecting device according to the preferred embodiment of the invention.

FIG. 8 shows a cross section view of a semiconductor interferometric reflecting device according to a further embodiment of the present invention, where also the bandgaps of the different layers have been engineered in order to improve the device performance. In this case, the band-gap of the 41 layers (i.e. Eg2) can be chosen to be lower than the band-gap of layers 43 (i.e. Eg1) so as to form a series of quantum wells and exploit the quantum-confined Stark effect to increase the refractive index variation as a function of the applied voltage.

FIG. 9

Figure 9:
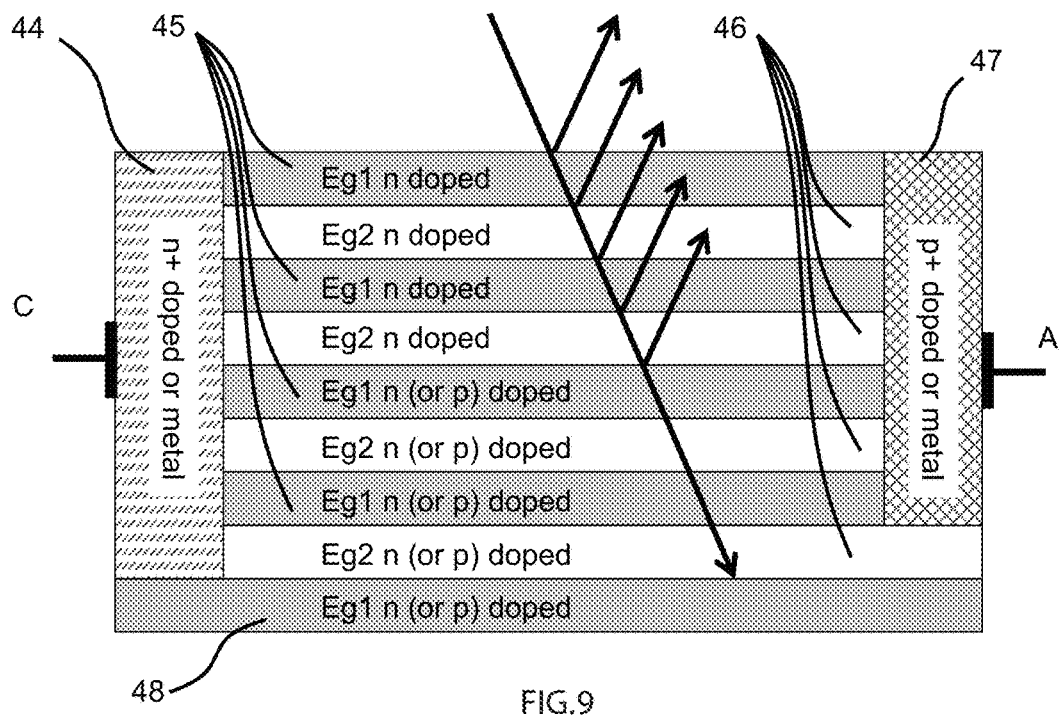
FIG. 9 shows a cross section view of a semiconductor interferometric reflecting device according to a further embodiment of the present invention with lateral contacts, where a series of quantum wells has been used to increase the refractive index variation as a function of the applied voltage.

Another embodiment of the present invention is illustrated in FIG. 9, where the contacts have been formed laterally rather than above or below the structure. Also hybrid versions are possible, where one contact is formed above or below the structure and the other one is lateral. Furthermore, also grid shaped contacts (e.g. as the ones used in solar-cells) are possible.

FIG. 10

Figure 10:
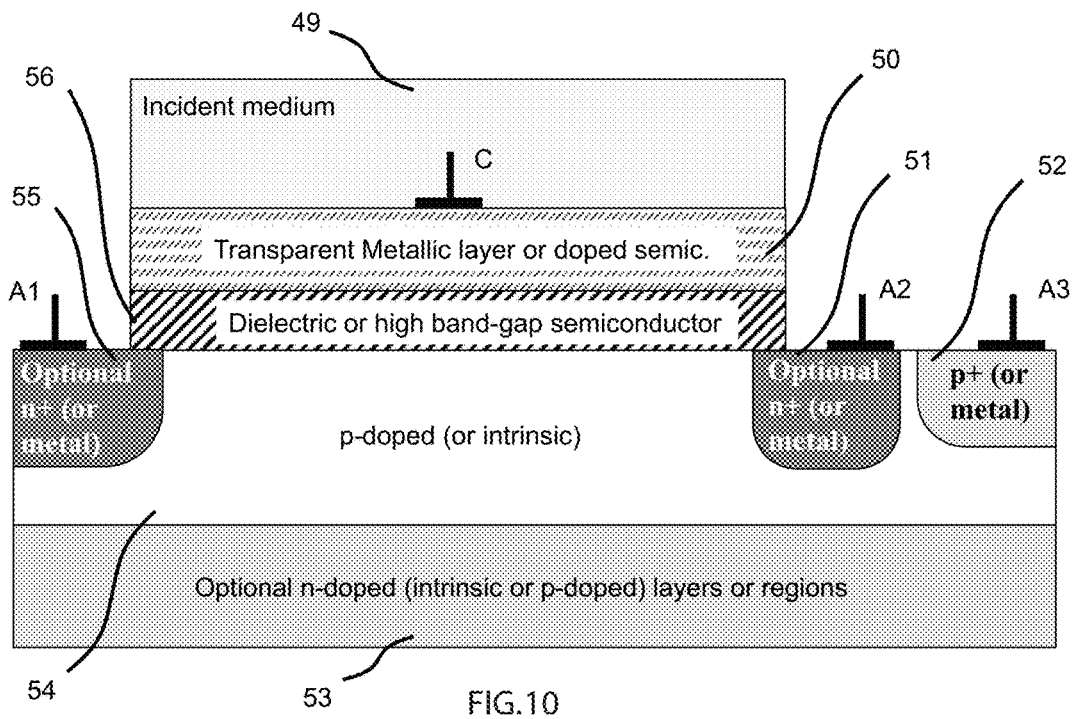
FIG. 10 shows a cross section view of a semiconductor interferometric reflecting device according to a further embodiment of the present invention, where the control of the interference of the reflected light has been obtained with MOS based structure instead of a rectifying junction.

An example of implementation of the present invention by using a Metal/dielectric/semiconductor structure (or a semiconductor/insulator/semiconductor structure) is shown in FIG. 10. As it can be seen this structure is very similar to the one of a MOSFET, with the difference that in this case the thickness of the conductive layer 50, the dielectric layer 56 and, if desired, also the layers 54 and 53 (if present) are carefully chosen in order to obtain interference of the light rays reflected at the device interfaces.

The conductive layer 50 can be made both in transparent metallic materials (such as Indium Tin Oxide—ITO) or doped semiconductors (lowly or highly doped). The two n+ regions 51 and 55 are optional. However it is preferred to have at least one of them in order to supply carriers to the inversion layer that forms at the semiconductor/dielectric interface when the structure is opportunely biased. Region 52 contacting the substrate 54 can be also formed in the dimension perpendicular to the shown cross-section. Under layer 54 one or more optional layers can be formed in order to optimize the optical properties of the device. Furthermore, the dielectric barrier layer 56 can be replaced with a high-band gap material so as to obtain a HFET like structure (in this case, if desired, the two regions 51 and 55 can be formed on top of layer 56).

FIG. 11

Figure 11:
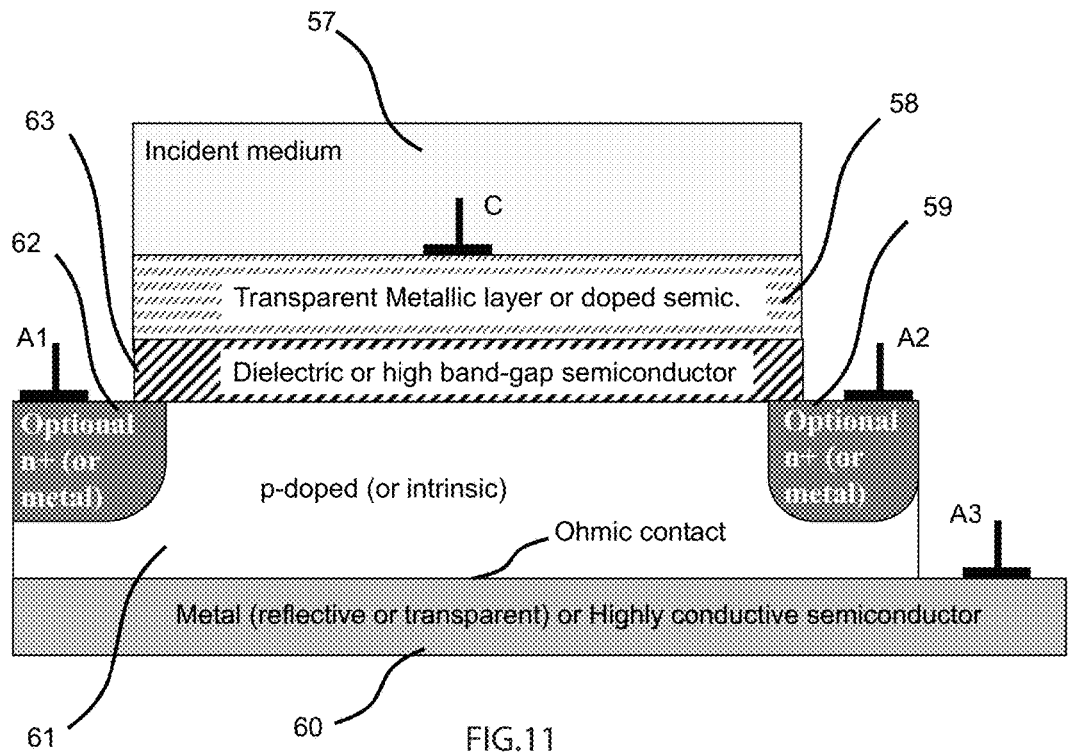
FIG. 11 shows a cross section view of a semiconductor interferometric reflecting device according to a further embodiment of the present invention, where the modulation layer has been contacted on the bottom side.

Another embodiment of the present invention employing a MOS (or a Hetero-structure) based structure is illustrated in FIG. 11. In this case, the modulation layer 61 has been contacted on the bottom side.

FIG. 12

Figure 12:
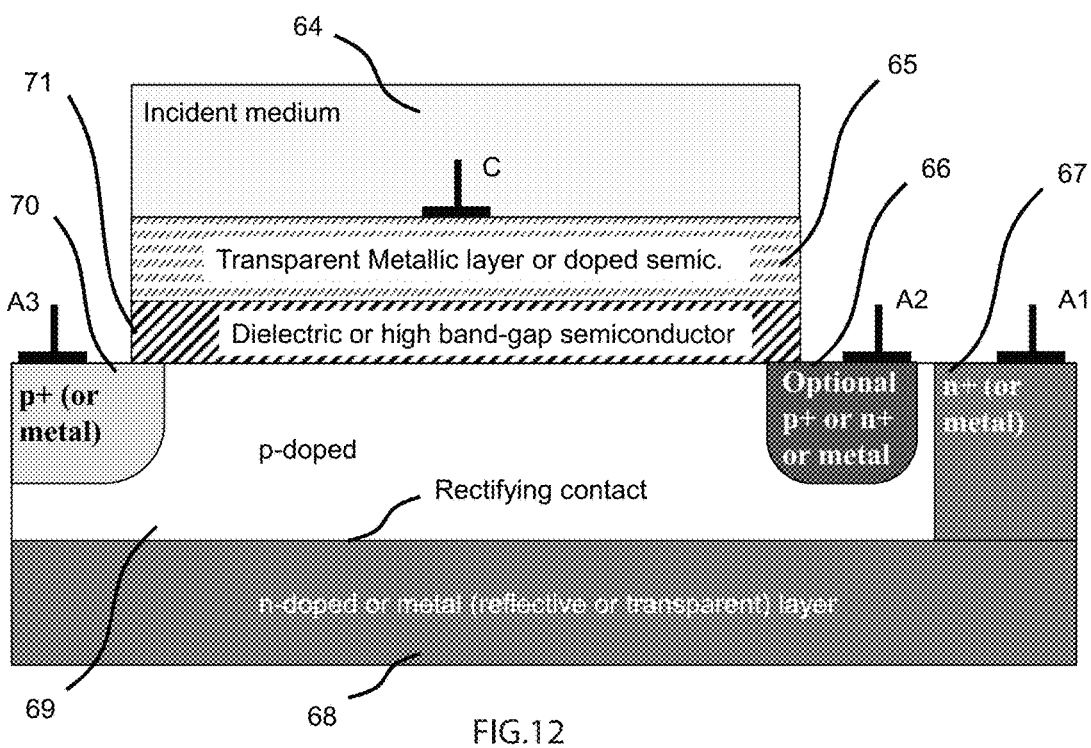
FIG. 12 shows a cross section view of a semiconductor interferometric reflecting device according to a further embodiment of the present invention, where both a MOS and a rectifying junction have been used in order to modulate the reflected light.

Another interesting implementation of the present invention is reported in FIG. 12, where a rectifying junction has been formed under the modulation layer 69 in order to improve the modulation capabilities of the device. In this case region 70 is used to contact the modulation layer 69 and region 67 is used to bias the buried region 68. Region 66 is optional and it can be doped with p-type impurities in order to improve the control on the bias of the modulation layer 69 or it can be n-doped in order to supply electrons at the semiconductor/dielectric interface (when needed). Furthermore, region 67 can be formed in the dimension perpendicular to the shown cross section or can be auto-aligned with layer 65 when region 66 is omitted. Region 68 can be also made in metallic materials (in this case the contacting region 67 can be formed in a many ways).

FIG. 13

Figure 13:
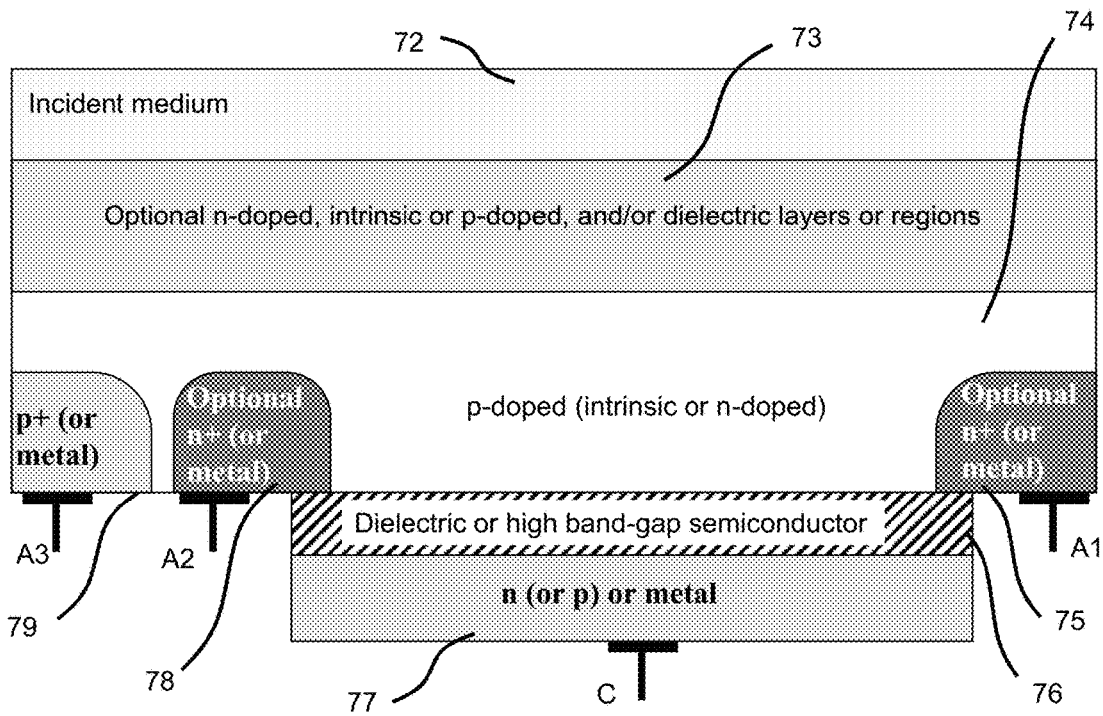
FIG. 13 shows a cross section view of a semiconductor interferometric reflecting device according to a further embodiment of the present invention. This structure is similar to the one of FIG. 10, with the difference that in this case the incident light hits the MOS system through the semiconductor modulation layer.
Figure 14:
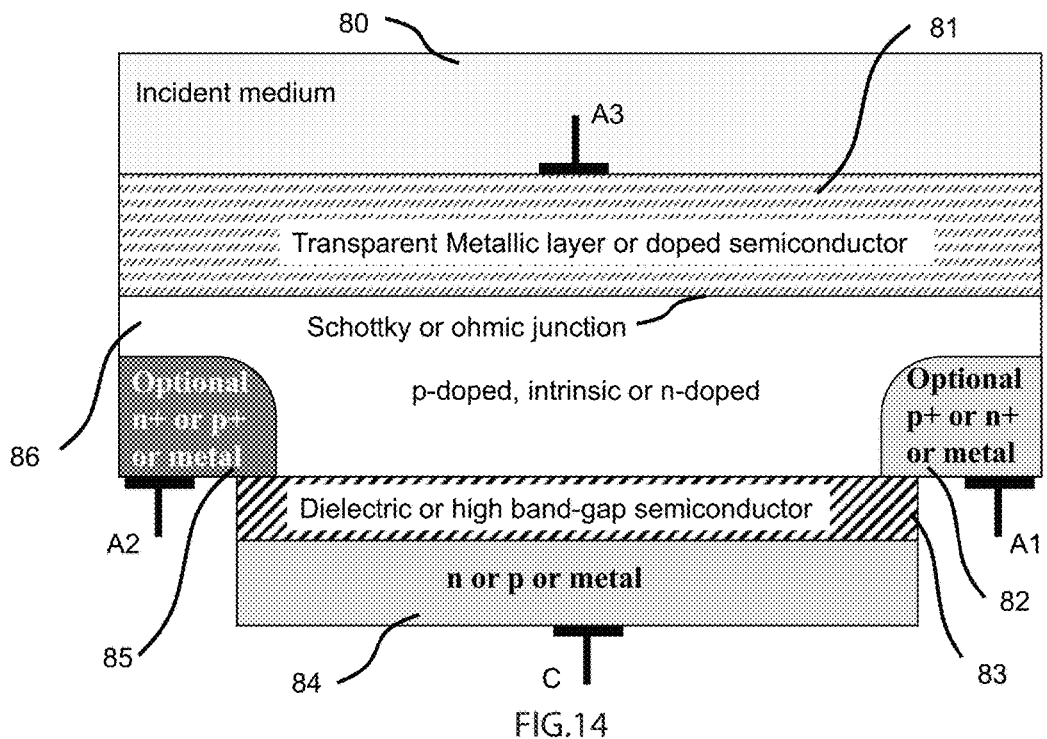
FIG. 14 shows a cross section view of a semiconductor interferometric reflecting device according to a further embodiment of the present invention. This structure is similar to the ones of FIGS. 11 and 12, with the difference that in this case the incident light hits the MOS system through the semiconductor modulation layer.

The embodiments discussed above can be also used upside down as shown in FIGS. 13 and 14. These two configurations are of particular interest when realized with organic semiconductor materials. In the embodiment of FIG. 13 the incident light hits first the semiconductor modulation layer 74. Regions 75 and 78 are optional and they can be or not auto-aligned with region 77 and 76. Regions 75 and 78 can also be created not in contact with the semiconductor/dielectric interface. Furthermore, they can be also realized on the upper portion or on top of the modulation layer 74 (configuration particularly practical in the case where organic semiconductors are used) or in the dimension perpendicular to the shown cross section. Similar considerations holds true for region 79 which is used to contact the modulation layer 74. Layers 73 are optional and can include (or be replaced) by a passivation layer.

N FIG. 14

FIG. 14 shows a cross section view of a semiconductor interferometric reflecting device according to a further embodiment of the present invention. This structure is similar to the ones of FIGS. 11 and 12, with the difference that in this case the incident light hits the MOS system through the semiconductor modulation layer. Also in this structure, if the optional layer 81 is omitted or is mash shaped, regions 82 and/or 85 can be realized (if desired) on the upper portion or on top of the modulation layer 86.

O FIG. 15

Figure 15:
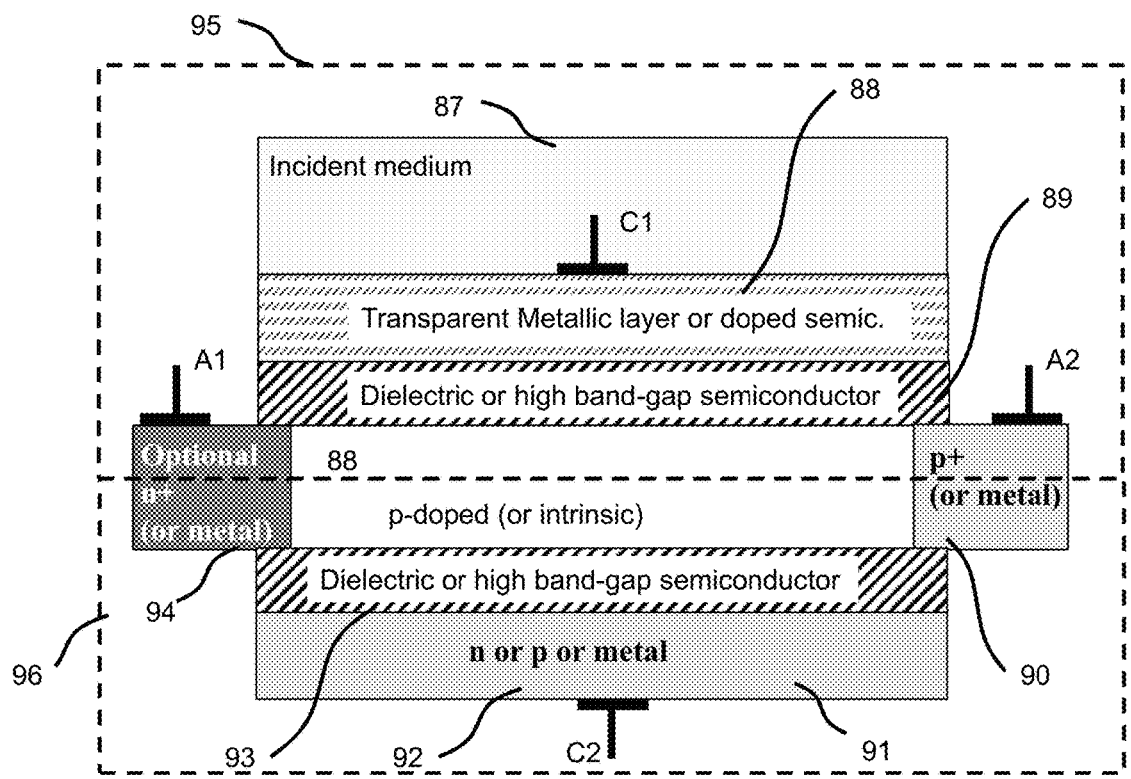
FIG. 15 shows a cross section view of a semiconductor interferometric reflecting device according to a further embodiment of the present invention. This structure has been obtained placing back-to-back to semiconductor interferometric reflecting device according to the embodiment of FIG. 13.

Multiple modulation system as the ones discussed above can be stacked in order to improve the device performance. An example of embodiment where two MOS systems 95 and 96 have been stacked one on top of the other is reported in FIG. 15. In this case one of the two MOS system (96) has been formed upside-down with respect to the other one (95) in order to share the modulation layer 88 between the two. Similar combinations can be obtained by combining two or more other structures reflecting another embodiment (or different ones) of the present invention.

P FIG. 16

Figure 16:
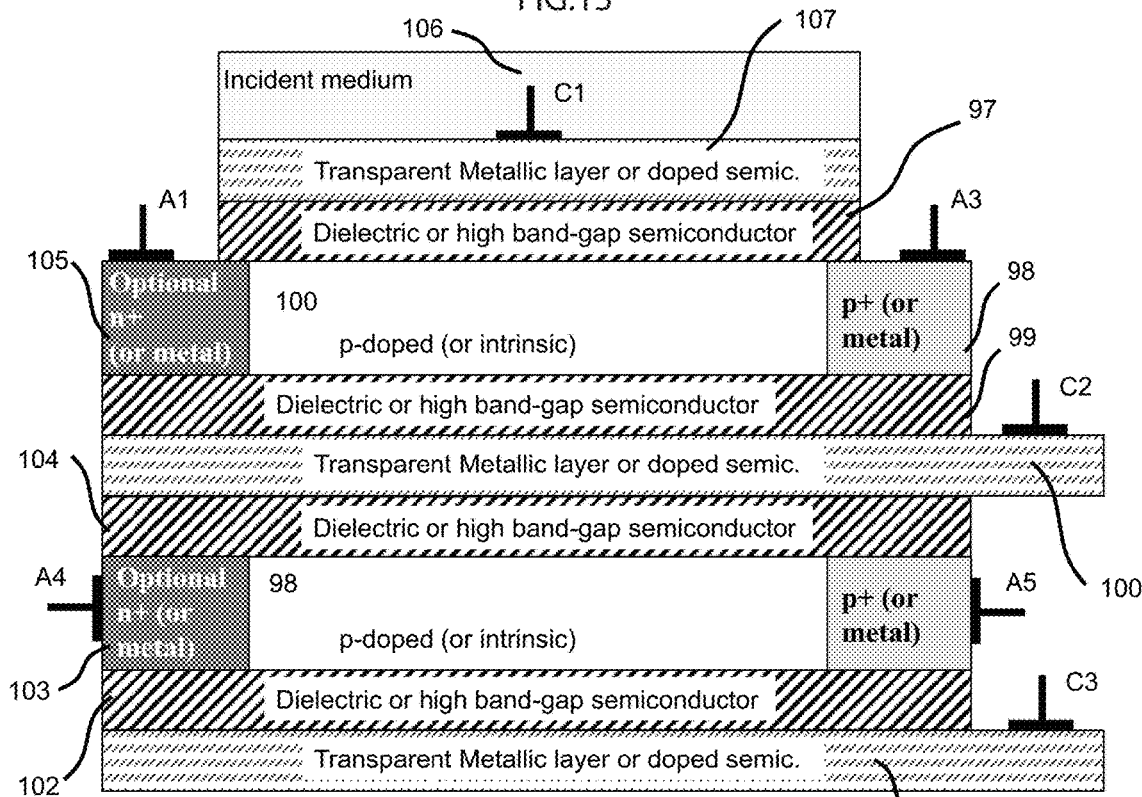
FIG. 16 shows a cross section view of a semiconductor interferometric reflecting device according to a further embodiment of the present invention. This structure has been obtained stacking multiple modulation systems one on top of each-other.
Figure 17:
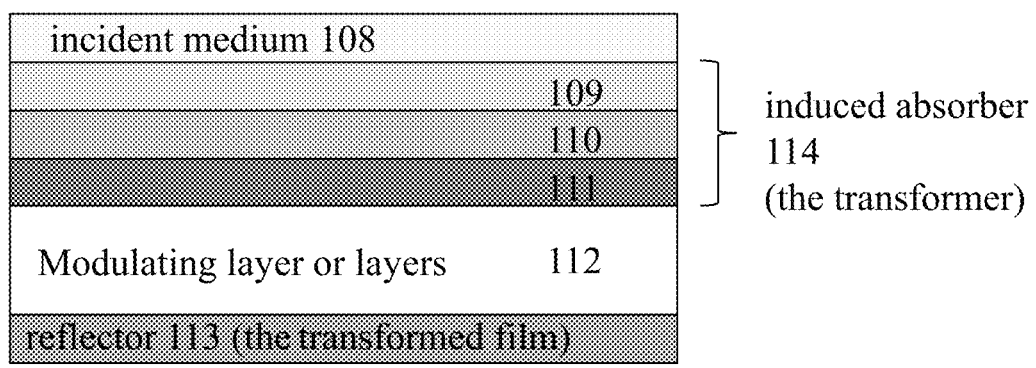
FIG. 17 shows a cross section view of a semiconductor interferometric reflecting device according to a further embodiment of the invention, where optically matching layers have been added to the structure in order to improve the device performance.

Multiple modulation systems can be also combined as shown in FIG. 16. Also in this case, similar combinations can be obtained by combining two or more other structures reflecting another embodiment (or different ones) of the present invention.

Q FIG. 17

FIG. 10 shows a cross section view of a semiconductor interferometric reflecting device according to a further embodiment of the invention, where optically matching layers have been added to the structure in order to improve the device performance. Reflector 113 (the transformed film) is separated from induced absorber 114 (the transformer), comprising films 109, 110, and 111, by a variable refractive index spacer 112 (the modulating layer). Incident medium 108 bounds the other side of induced absorber 114. The first layer 109 is to match the admittances of reflector 113 and incident medium 108. This is accomplished via matching layer 111, which is used to transform the admittance of absorber 110 to match that one of the incident medium 108, and via matching layer 109, which is used to transform the admittance of reflector 113 to match that one of absorber 110. The second function is the absorption of light. This is accomplished using absorber 110, which performs the function of attenuating light which is incident upon it through the medium, as well as light that is incident upon it from the reflector. The ability to alter the refractive index of spacer 112 (or of the layers forming the induced absorber) allows the alteration of the optical characteristics of the entire structure.

In many of the described embodiments, the p+ region can be replaced by a Schottky contact and/or the n+ region can be replaced with a metal ohmic contact (or vice-versa). When a Schottky contact is used in combination with a III-V process technology, an optional extra wide energy-gap layer can be interposed between the metal and the n-doped semiconductor in order to reduce the current leakage associated with the Schottky contact.

Furthermore, if desired, also a Metal/dielectric/semiconductor structure (or a semiconductor/insulator/semiconductor structure) can be used instead of a rectifying junction in order to modulate the refractive index and/or the absorption coefficient of at least a portion of a semiconductor layer according to the present invention.

The present invention can be used also in combination of volatile (e.g. RAM) or non-volatile (e.g. Flash or EEPROM) memory elements, in order to store the parameters of the reflected light. In some of the embodiments herein described, the memory element can be directly integrated in the interferometric reflecting device. For example, in the case of a MOS based interferometric reflecting device, by adding a floating gate/oxide stack between the control gate oxide and the semiconductor modulating layer, it is possible to store a controlling charge directly in the extra gate so as to maintain the value of the carrier concentration in the semiconductor layer (and therefore of the reflected light) also when the bias voltage is removed. This characteristic can be very useful in case of flat panel displays fabricated by using pixels based on these new semiconductor structures in applications where the image must be maintained unaltered for a prolonged period of time.

All the described embodiments can be built in many different technologies, comprising: Bulk, Semiconductor On Insulator, Semiconductor On Sapphire, Thin-film-transistor technology, barium-strontium-titanate, III-V technology with or without hetero-junctions or organic semiconductor technology. Furthermore the concept of the present invention can be realized also with organic semiconductor materials in order to obtain low cost reflective devices.

All the embodiments illustrated above can be realized as both discrete and integrated components with minimal changes. For each one of them, the dual version can be obtained by simply substituting the n-doped regions with p-type ones and vice-versa. Many other configurations can be obtained by combining the different embodiments described above and their variants. In general, supplemental contacts can be added in the third dimension (perpendicular to the ones shown) in order to improve the device performance.

In all the embodiments described above, the same rectifying junction can be designed to behave at the same time as a light reflecting diode and a light emitting diode depending on the bias applied to the junction: when the junction is operating in reverse bias condition the device behaves as a reflector, modulating the intensity of the reflected light, whereas when the rectifying junction is forward biased the electron-hole recombination that takes place inside the device leads the structure to behave like an LED. Furthermore, the MOS based structures can be designed to work at the same time as interferometric reflector and Light Emitting Transistor (LET).

The modulation of light by applying a voltage to a semiconductor in order to change the optical properties of the medium can also be applied by means of a PWM signal, in order to reflect the electromagnetic radiation at a given frequency while varying its intensity. Or dithering of the signal can also be implemented to spread the bandwidth of the reflected electromagnetic radiation within a desired range of frequencies.

The present invention has been described with reference to electromagnetic radiation within the visible range, but the same concept could be applied to the electromagnetic radiation within the UV (Ultra-Violet) range of frequencies or within the IR (InfraRed) range of frequencies. The semiconductor interferometer concept may be also applied to any frequencies of electromagnetic radiations provided that the semiconductor properties of the medium within a specific frequency can be successfully controlled.

Although the present invention has been described above with particularity, this was merely to teach one of ordinary skill in the art how to make and use the invention. Many additional modifications will fall within the scope of the invention. Thus, the scope of the invention is defined by the claims which immediately follow.

What is claimed is:

1. A method to control a reflection of at least a portion of an incident light in an individual element of a display comprising:
varying an optical parameter of at least a portion of a semiconductor medium by modulating a carrier concentration or an allowed carrier energy state in at least a portion of said semiconductor medium,
wherein said incident light is an ambient light comprising at least two wavelengths;
wherein said variation of said optical parameter is obtained by varying a bias voltage;
wherein said variation of said optical parameter controls said reflection of said portion of said ambient incident light;
wherein said reflection of said portion of said ambient incident light is controlled by selectively reflecting at least one of said wavelengths;
wherein at least a portion of said reflection of said ambient incident light is obtained through constructive interference of at least two reflected light rays, and
wherein said constructive interference is controlled by said optical parameter.

2. The method of claim 1, wherein a portion of said incident light is reflected at an interface of said semiconductor medium and wherein at least one parameter among intensity, wavelength, phase and reflective angle of said reflected light is varied by varying said optical parameter.

3. The method of claim 1, wherein, when said bias voltage is within a first voltage range, said interferometric device emits light, and
wherein, when said bias voltage is within a second voltage range, said interferometric device modulates said reflection of said incident light.

4. A display for an electronic device wherein each individual element of said display is controlled using the method of claim 1.

5. A display for electronic device wherein a portion not reflected of said incident light is passed through said display according to the method of claim 1.

6. The method of claim 1, further comprising compensating a shift in wavelength of the reflected light by varying an angle of incidence of said incident light by means of at least one optical compensation layer.

7. A display for an electronic device wherein each individual element of said display is controlled using the method of claim 1, further comprising integrated light emitting devices;
wherein said light emitting devices provide supplemental light when ambient light is not sufficient to obtain a desired level of reflected light intensity.

8. An interferometric device to control the reflection of at least a portion of an incident light comprising a structure belonging to the group composed of a rectifying junction, a metal-insulator-semiconductor stack, a semiconductor-insulator-semiconductor stack, a control gate-dielectric-floating gate-dielectric-semiconductor stack, a heterostructure stack, and a heterojunction;
wherein said structure is comprising:
a conductive region;
a semiconductor layer;
and a substrate layer;
wherein said conductive region is made of a material belonging to the group comprising metallic and doped semiconductor materials;
wherein said substrate layer is substantially either light absorbing or light reflective;
wherein a variation of a bias voltage applied to said interferometric device modulates an optical parameter of at least a portion of said semiconductor layer;
wherein said modulation of said optical parameter controls said reflection of said portion of said incident light by means of constructive interference;
wherein said incident light is a ambient light comprising at least two wavelengths;
wherein said structure is structured such that said reflection of said portion of said ambient incident light is controlled by selectively reflecting at least a first wavelength of said wavelengths and substantially cancel the reflection of at least a second wavelength of said wavelengths;
wherein said ambient incident light enters said interferometric device through an outer surface,
wherein said reflected portion of said incident ambient light exits said interferometric device through said outer surface, and
wherein said interferometric device is an individual element of a display.

9. The interferometric device of claim 8, wherein at least one parameter among intensity, wavelength, phase and reflective angle of said reflection of said portion of said incident light is modulated by varying said bias voltage.

10. The interferometric device of claim 8, wherein at least a portion of said reflection is obtained through said constructive interference resulting from reflection of said incident light on at least two interfaces of said interferometric device, and wherein said constructive interference is controlled by said bias voltage.

11. The interferometric device of claim 8, further comprising a barrier layer made of a material belonging to the group comprising dielectric and semiconductor materials.

12. The interferometric device of claim 8, wherein, when said bias voltage is within a first voltage range, said interferometric device emits light, and wherein, when said bias voltage is within a second voltage range, said interferometric device modulates said reflection of said portion of said incident light.

13. The interferometric device of claim 8,
wherein said structure comprises a rectifying junction;
wherein, when said rectifying junction is forward biased said interferometric device emits light, and
wherein, when said rectifying junction is reversed biased, said interferometric device modulates said reflection of said portion of said incident light.

14. The interferometric device of claim 8, wherein said belongs to the group comprising a metal-insulator-semiconductor stack, a semiconductor-insulator-semiconductor stack, a hetero-structure stack, and a control gate-dielectric-floating gate-dielectric-semiconductor stack;
wherein, when said bias voltage is within a first voltage range, said interferometric device behaves as a light emitting transistor, and
wherein, when said bias voltage is within a second voltage range, said interferometric device controls said reflection of said portion of said incident light.

15. The interferometric device of claim 8, further comprising an extra layer belonging to the group comprising an optical compensation layer, and an optically matching layer;
   wherein said optical compensation layer reduces the shift in wavelength of the reflected light with the angle of incidence of said incident light, and
   wherein said optically matching layer matches the optical admittance of at least one layer of said system.

16. A display for an electronic device comprising multiple interferometric devices according to claim 8, and further comprising integrated light emitting devices;
   wherein said light emitting devices provide supplemental light when ambient light is not sufficient to obtain a desired level of reflected light intensity.

17. The interferometric device of claim 8, wherein a thickness of at least one between said semiconductor layer, and said conductive region is selected to create constructive interference of at least two reflected light rays.

18. An interferometric device to control a reflection of a portion of incident light comprising:
   a system comprising:
      a conductive region;
      and a semiconductor layer;
   wherein said conductive region is made of a material belonging to the group comprising metallic and doped semiconductor materials;
   wherein a modulating bias voltage applied across said system modulates an optical parameter of at least a portion of said semiconductor layer by modulating a carrier concentration or an allowed carrier energy state in at least a portion of said modulating semiconductor layer;
   wherein said modulation of said optical parameter controls said reflection of said portion of said incident light by means of constructive interference;
   wherein said incident light is a ambient light comprising at least two wavelengths;
   wherein said structure is structured such that said reflection of said portion of said ambient incident light is controlled by selectively reflecting at least a first wavelength of said wavelengths and substantially cancel the reflection of at least a second wavelength of said wavelengths;
   wherein said ambient incident light enters said interferometric device through an outer surface,
   wherein said reflected portion of said incident ambient light exits said interferometric device through said outer surface, and
   wherein said interferometric device is an individual element of a display.

* * * * *